United States Patent

[11] 3,618,742

[72] Inventors Stanley J. Blanchard
 4 Washington Square Village, New York, N.Y. 10012;
 George C. Devol, 990 Ridgefield Road, Wilton, Conn. 06897; Paul S. Martin, 189-54 43rd Road, Flushing, N.Y. 11358
[21] Appl. No. 38,020
[22] Filed May 18, 1970
[45] Patented Nov. 9, 1971

[54] AUTOMATIC OBJECT ADJUSTMENT
 14 Claims, 7 Drawing Figs.
[52] U.S. Cl. ................................. 198/33 AB, 198/40
[51] Int. Cl. ............................... B65g 47/24, B65g 43/00

[50] Field of Search ......................... 198/33 AA, 33 R, 33 AB, 40, 340, 235, 317, 318

[56] References Cited
UNITED STATES PATENTS
2,877,884 3/1959 Esenwein ............... 198/33 AA
3,482,673 12/1969 Temple ................. 198/33 AB Primary Examiner—Richard E. Aegerter
Attorney—Paul S. Martin ABSTRACT: An object in a desired position is subjected to a circular scan about a reference point and the result is stored as a pattern of impulses representing the contrast between the object and the background. Articles that are later disposed at random angles about the same reference point are subjected to a circular scan, the result is compared with the stored pattern of impulses, and the result of the comparison is used for adjusting the later articles to the desired orientation.

AUTOMATIC OBJECT ADJUSTMENT

This invention relates to methods and apparatus for automatically adjusting an object from an initially random position to a desired position.

A general object of the invention resides in providing novel means and methods for measuring the extent to which an object initially in a random position departs from a desired position and for automatically adjusting the object to the desired position.

This invention is intended primarily as an improvement in program-controlled article-transfer apparatus, or article-handling robots, and for that reason it is described below in that connection. However, the invention has other applications and therefore it should not be limited to article-transfer robots except where required by the context.

Articles or objects of any given shape must often be delivered in a prescribed orientation. For example, such regulated delivery of a component part is necessary in an automatic assembly operation, and in automatically feeding a drill press, a stamping press or other work unit, or for orderly stacking of articles, or for loading articles onto a pallet in a prescribed pattern.

An object of the present invention resides in providing novel methods and apparatus for recognizing the extent to which an object, as supplied, differs from its desired orientation.

A more specific object resides in providing novel methods and means for obtaining and utilizing digital data representing the displacement required to move an object into a desired position, starting with a position that is random in one respect.

These and other objects are achieved in the illustrative embodiments of the invention shown in the accompanying drawings and described in detail below. The novel features and their advantages will be readily recognized and appreciated. In these illustrative embodiments, an article transfer robot including an article holder is operable under control of a digital-recorded program. Digital data is also used for controlling an article holder in automatically adjusting the position of an object. This adjustment control data is obtained by scanning a characteristic portion of a random-positioned object that identifies its position to produce a scan pattern of the object in its random position, comparing the random-position scan pattern to a stored scan pattern representing the object in the desired orientation, shifting one of the compared patterns in relation to the other repeatedly in regular increments and repeating the comparisons after each shift until an acceptable match is obtained, accumulating the number of shifts needed to obtain the match, and using the accumulated number to control a digital adjustment control of the object holder.

In one form of the control-data-deriving apparatus described below, the position-representing scan of a random-positioned object is stored, and it is this stored representation that is compared repeatedly with the stored representation of an object of the same shape in the desired position. In another described form of apparatus, the ramdom-positioned object is scanned repeatedly in making the successive comparisons. The latter form of apparatus omits a storage circuit included in the first form of the apparatus for storing the random-position scan pattern. However, in this other form of the adjustment data-deriving apparatus, it is necessary to leave the random-positioned object in scanning position during the time necessary for repeated comparisons to take place until match is reached.

The nature of the invention in its various aspects including the foregoing and other objects and novel features and their advantages will be more fully appreciated from the following detailed description of an object transfer apparatus including two forms of digital control apparatus for correcting the position of an object from a random starting position to a desired position.

Figure 1:
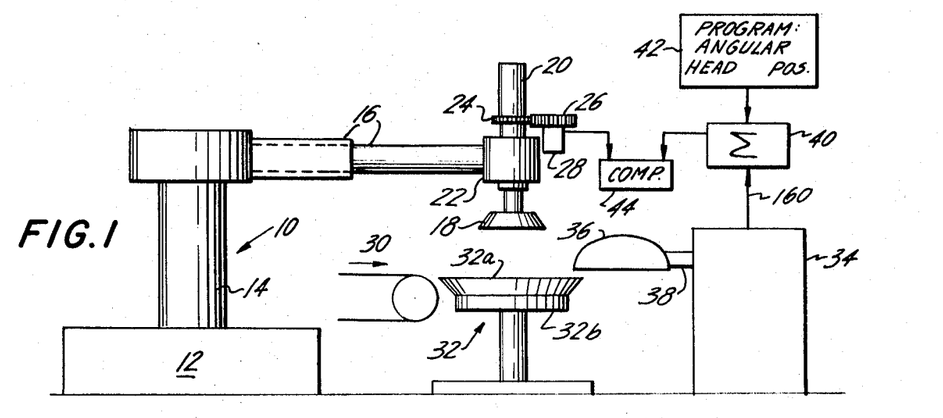
FIG. 1 is a diagrammatic lateral elevation of a conveyor, an article-centering device and an article transfer unit having an article holder aligned vertically above the article-centering device.
Figure 2:
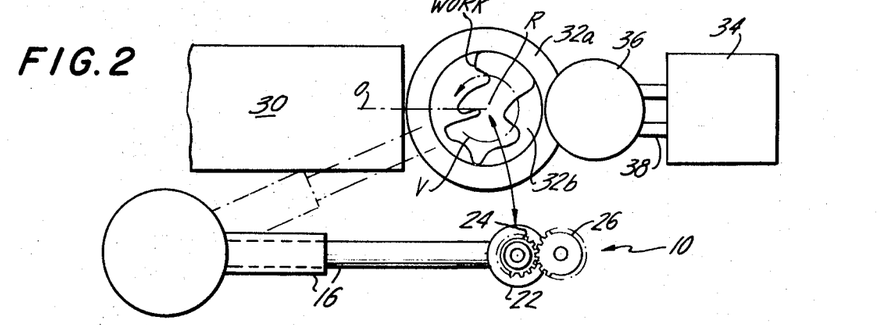
FIG. 2 is a top plan view of the apparatus of FIG. 1 showing the article holder displaced from the position of FIG. 1; one presently preferred apparatus for controlling the rotation of the article holder in the apparatus in FIGS. 1 and 2.

Referring now to the apparatus shown in FIGS. 1 and 2, an article transfer unit 10 is shown, including a base 12, a post 14 rotatable about its axis, a telescopic arm 16 carried by post 14, and an article holder 18 that is movable vertically by a piston in hydraulic cylinder actuator 20 carried by head 22. For example, article holder 18 may be an electromagnet or a suitable multiport vacuum gripper. Head 22 at the end of arm 16 contains a rotational bearing and a rotational drive means for rotating hydraulic actuator 20. Article holder 18 is suitably constrained against rotation relative to the cylinder of actuator 20. Accordingly, when actuator 20 rotates about its axis, article holder 18 rotates with it. A gear 24 on the rotatable actuator 20 meshes with a gear 26 on a digital shaft position encoder 28 carried by head 22.

Apparatus 10 includes suitable program control apparatus of the type in U. S. Patents Nos. 2,988,237, 3,306,471 and 3,279,624. The apparatus 10 also includes actuators (additional to actuator 20) operable under program control for rotating post 14, for extending and retracting arm 16, and for rotating actuator 20. Such program-controlled article-transfer apparatus is effective for operating article holder 18 automatically in any desired sequence of motions.

Conveyor 30 is here arranged to deliver articles such as sheet metal objects one at a time to a support unit 32 including a funnellike guide portion 32a and a flat circular 30 to unit 32 come to rest on support 32b. The diameter of support 32b as limited by the smallest diameter part of guide 32a is equal to the minimum diameter circle capable of surrounding the workpieces or objects W. Unit 32 represents a simplified illustrative device for locating a prescribed "center" point in the object at a prescribed location in relation to the axis of article holder 18.

Adjacent to unit 32 there is a scanning unit 34 having a vidicon 36 carried by arms 38 of a horizontal actuator. Vidicon 36 is moved by unit 34 between the retracted position shown and an extended position in which the center of the vidicon is disposed vertically above the center of support 32b. The center of support 32b establishes a reference point R about which vidicon 36 can execute a circular scan V to represent the angular orientation of workpiece W.

Starting from a reference line 0 as zero degrees of the circular scan, the vidicon produces an output of extreme contrasts, where the article background (e.g. dark) contrasts with the illuminated surface of the object (e.g., light) so that, for the shape of the object W illustrated in FIG. 1, and with the object in the desired position (FIG. 4), a threshold- and-peak-limited circular scan will produce a pattern $p$ consisting (here) of two regions of flat high output separated by two regions of no output. FIG. 5 represents the pattern $p'$ of another object (or the same object) in a random angular position different from that illustrated in FIG. 4.

As shown in FIG. 2, head 22 is located at a delivery point. Head 22 is operable under program control to another position in which the common axis of hydraulic actuator 20 and article holder 18 are aligned with the reference point R, as represented in FIG. 1. The delivery location may be any receiver such as a table of a drill press, for example, equipped with one or more drills arranged to make holes in desired spots in each delivered object.

At the outset, when the apparatus is being set up for executing an automatic sequence of operations, an object is manually adjusted into the desired position at the receiving location. Apparatus 10 is then operated under manual control so as to transfer the workpiece W to support 32b. (This is the reverse of the path to be followed in the subsequent program-controlled operations.) The relationship between article holder 18 and head 22 is kept constant during the motion of the head in transferring the object to support 32b. Consequently, the work object W is in the desired angular position when thus deposited on support 32b. If the object were then picked up by article holder 18 and transferred to the delivery location by a reverse-programmed motion in which article holder 18 is not allowed to rotate relative to head 22, the object will have been delivered in the desired angular position.

The fixed relationship between article holder 18 and head 22 in the foregoing operation is not a limitation on the use of article holder 18. In some situations, there may be a requirement for the article holder 18 to rotate through a given angle in the motion of head 22 from the support 32b to the receiving location; and in that case, the article holder would be reversely rotated through the given angle in moving from the receiving location to the support 32b in the foregoing setup operation.

Unit 34 is operated to shift vidicon 36 into position so that its scanning pattern is centered at reference point R. A scanning radius is then selected by a manual adjustment to produce a circular scan vidicon output that will uniquely represent the angular position of the object. A circular scan is then executed commencing with the reference line 0, and the circular scan $p$ (FIG. 4) is stored as more fully discussed below.

The various motions of the article transfer apparatus 10, the vidicon-projecting operation of unit 34, and the operation of conveyor 30 to deliver objects W as needed, are all coordinated and are then automatically executed under suitable program control. Subsequently, when an object is first delivered by conveyor 30 to supporting surface 32b in random angular orientation but otherwise centered at reference point R, the vidicon 36 is projected into scanning position and caused to execute a circular scan. Typically, a scan pattern $p'$ is produced as illustrated in FIG. 5 that is a duplicate of the scan pattern $p$ in FIG. 4 except that it is angularly offset. The control apparatus in FIGS. 3A and B (or that in FIG. 6) provides a digital output that is combined in summing unit 40 with the output of that portion of the program control apparatus 42 which provides digital output for determining the angular position of article holder 18. The combined digital information from summing unit 40 is supplied to comparator 44 which also receives a digital code output from shaft position encoder 28. The numerical difference between the output of unit 40 and the digital code of unit 28 provides for proper control of the actuator in unit 22 that rotates cylinder 20 and head 18. Control apparatus of this type is illustrated in U. S. Pat. No. 2,927,258, issued Mar. 1, 1960 to B. Lippel, se that no detailed description of such apparatus is given here. It will be recognized that this described utilization of the digital output from the vidicon-controlled circuit that provides the position-correcting signal is well suited to apparatus of the type having digital coordinates representing each position of the work holder in its sequence of motions executed by the apparatus. However, in this and other known types of program control, the position-correcting output of the vidicon-controlled apparatus can be used differently. For example, if the only utilization of the described apparatus for controlling the rotation of the work holder is to execute an article-position-correcting rotation, then the control program would ordinarily cause work holder 18 to stay in an invariable "home" position determined, for example, by a limit switch, and then the summer 40 could be omitted from the control apparatus that determines the rotation of the work holder 18. Also, the article-position-correcting signal provided by the vidicon and its related apparatus (FIGS. 3A and 3B) may be used in what may be called "incremental" program control systems. In such systems, the control program provides an incremental control number at each point in a program-controlled sequence of motions, and the control member represents only the change in the work holder position that is to take place between one step and the next in the programmed sequence of motions. In that event, the described rotation control apparatus would omit encoder 28 and comparator 44, but such a system would take full advantage of the digital form of the output provided by the vidicon-controlled apparatus. In still other forms of program control for article transfer apparatus where digital control is not used, the digital output of the vidicon-controlled apparatus would have to be converted to the appropriate form of control signal.

Figure 3A:
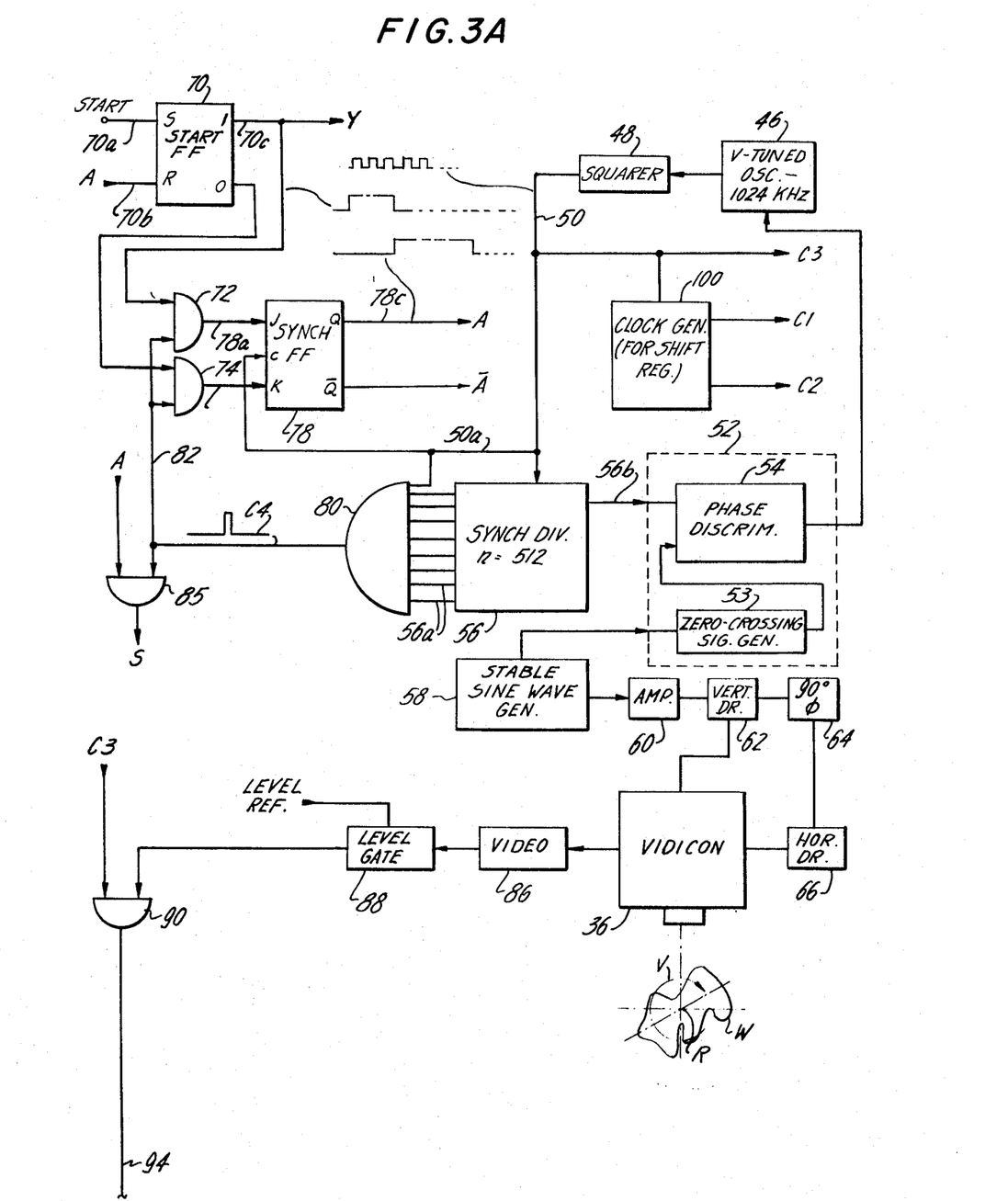
Figure 3B:
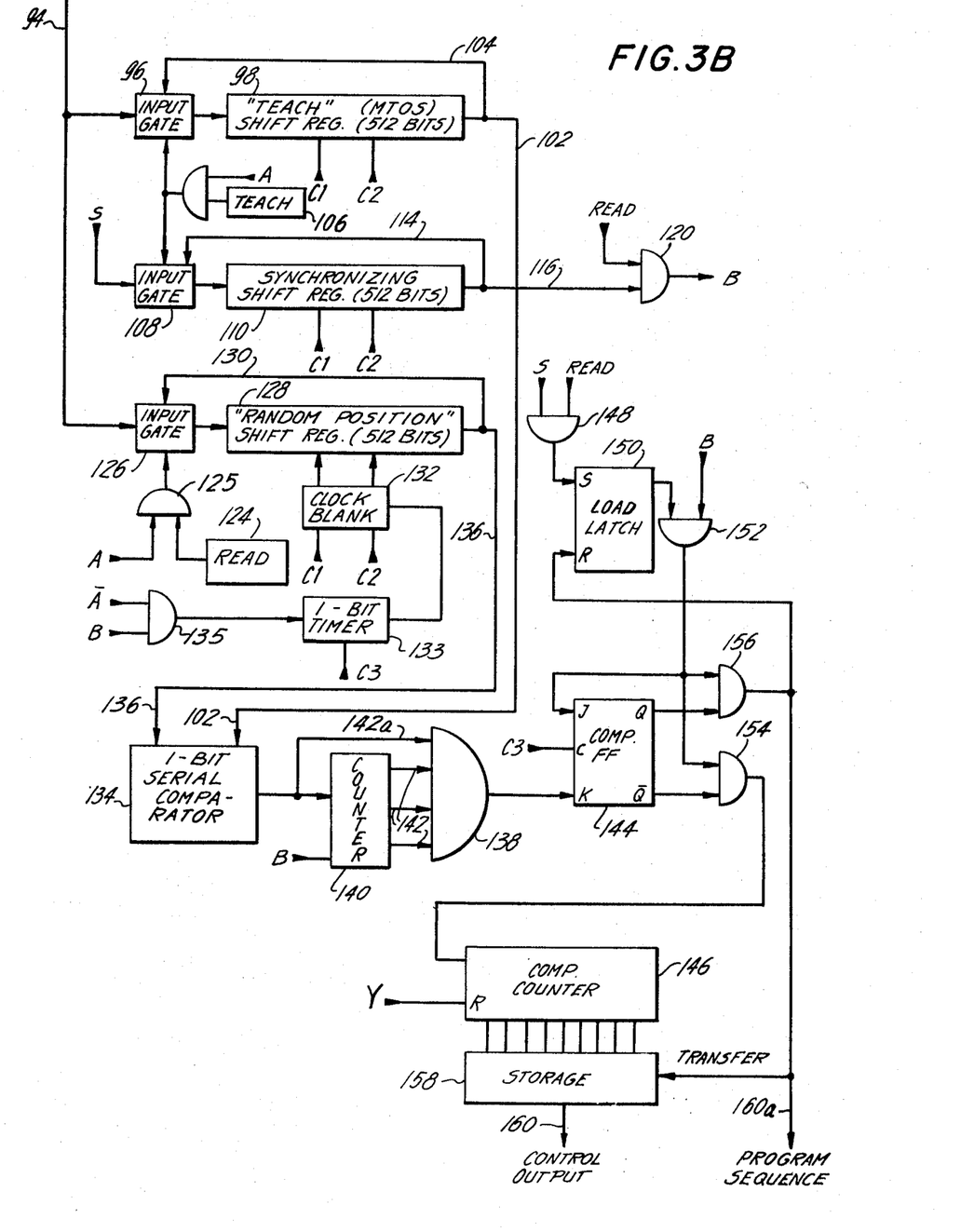

The apparatus in FIGS. 3A and 3B provides automatic input into summer 40 representing the digital adjustment needed for correcting the angular position of an object W delivered with random angular orientation on support 32b. Unit 10 is programmed for causing article holder 18 to pick up the random-positioned object, and after the object is seized it is correctly adjusted by rotation of article holder 18 about its axis as it carries the object from support 32b to the discharge or delivery location under program control.

In FIG. 3A, vidicon 36 is supplied with horizontal and vertical deflection signals in a conventional manner. A stable sine-wave generator 58 operates amplifier 60 to excite vertical deflection driver 62. A 90° phase shifter 64 is excited by vertical driver to operate horizontal deflection driver 66. These drivers are suitably related to each other in phase and in amplitude to produce a circular scan in vidicon 36. the radius of the circular scan is adjustable by adjusting the gain of amplifier 60. The scan circle diameter is adjusted so as to obtain a characteristic trace that most uniquely represents the angular orientation of the work object W. In some cases, there may be a truly summetrical object. In the case of a five pointed star, for example, any one of five different orientations would be acceptable. For most other objects, the diameter of the circular scan can be adjusted to provide a response signal from the vidicon that is uniquely related to the angular orientation of the work piece W.

In FIG. 3A, stable sine-wave generator 58 is designed to operate at $2KH_2$. Voltage-tunable oscillator 46 operates at $1024KH_2$ or at a factor $n=512$ times the frequency of sine-wave generator 58. (Of course, the values of the frequencies and of factor $n$ are given as examples.) A squarer 48 produces $1,024$ $KH_2$ pulses C3 that are applied to frequency divider 56. This divider has nine bistable stages so as to divide by the factor 512. Each time the divider is reset to "0", i.e., at intervals of 512 pulses C3, AND-gate 80 is driven by outputs 56a from divider 56 plus a square wave pulse C3 on line 50a to produce a single output pulse C4 on line 82. Pulses C4 may be considered reference pulses that mark the start (and end) of each scanning cycle of an article W.

The output of the final stage of divider 56 is applied by line 56b to one input of a synchronizer 52. This signal is a square wave of equal halves. It is compared to the sine-wave of generator 58. For example, synchronizer 52 may include a zero-crossing detector 53 that produces sharp output pulses in response to positive-going zero crossings (or negative-going zero crossings) of the circular scan sine-wave of generator 58. These output pulses are applied to phase discriminator 54 for phase comparison with zero crossings of the same sign or line 56b. The output of the phase discriminator is veraged to produce a control voltage for voltage-tunable oscillator 46. Thus, the signal-generating system that produces pulses C4 is phase locked to the sine-wave generator 58 and with the circular sweep of the vidicon. Essentially the same result can be achieved by making oscillator 58 in a form to be voltage tunable and oscillator 46 as a highly stable oscillator, in that case using the output of synchronizer 52 for controlling oscillator 58. Significantly, the signal that causes circular scan in vidicon 36 is accurately locked to the pulse generation part of the system.

Start latch 70 (a simple flip-flop, for example) is set by a starting pulse on input 70a. This is a timing signal suitably supplied as by an article detector in the apparatus of FIGS. 1 and 2, signifying that an article W is in position on support 32b and ready for scanning. The "1" output of flip-flop 70 appears as signal Y on line 70c and enables AND-gate 72. The next pulse C4 to gate 72 is transmitted to setting input 78a of synchronous flip-flop 78. Upon the decline of the input clock pulse C3 to flip-flop 78, setting takes place, thereby developing an output signal A at the "Q" output 78c of flip-flop 78 and terminating signal $\bar{A}$ at the "$\bar{Q}$" output. (Alternatively, flip-flop 78 can use pulse C4 instead of pulse C3 as its clock pulse input.) Gate 74 is controlled by the "O" or "not" output of flip-flop 70. After latch 78 has been set by one pulse C4, the succeeding pulse C4 to AND-gate 74 at reset input 78b of flip-flop 78 causes output 78c to be restored to normal at the fall of the incident clock pulse. This terminates signal A which thus has a duration of 512 square wave pulses C3 and equals one circular scan cycle of the vidicon, and signal A starts at or just after the end of pulse C4. The circular sweep in the vidicon passes what may be called a constant starting point each time signal A appears and completes a circular sweep at the end of signal A.

Square wave pulses C3 on line 50 energize source 100 for producing alternating clock pulses C1 and C2. These pulses are used for advancing the contents of shift registers to be described.

AND-gate 85 produces signal S. Gate 85 has one input connected to line 82 that carries pulses C4 and another input for signal A. Following each operation of Start latch 70, pulse S appears at the output of gate 85 at the end of signal A.

When vidicon 36 executes a circular scan, its output is amplified and shaped in video channel 86 and the resulting signal is limited by level gate 88 so as to produce no output for near black portions of the vidicon scan and so as to produce a uniform level output for the bright portions of the field scanned by vidicon 36. The thus-shaped video output signal reaches one signal input of AND-gate 90 which also has an input energized by pulses C3. Gate 90 acts as a pulse modulator. The vidicon output signal thus appears on line 94 as a pattern of pulses. There is a train of pulses for each bright area covered by the circular scan, and there is an interruption of pulses corresponding to the dark areas. In the full circular scan there are 512 times when a pulse may occur, so that the position of the article will be represented by a 512-bit code.

A "Teach" circulating shift register 98 (FIG. 3B) such as an MTOS shift register is provided for storing a pulse pattern representing an object in the desired position. The shift register 98 has an input gate 97. Clock pulses C1 and C2 from source 100 (FIG. 3A) cause "Teach" shift register 98 to advance its contents to its output 102, shifting from each stage to the next at the frequency of the oscillator 46. A circulating pulse connection 104 enables the output to be returned to the input of the Teach shift register, but only when input gate 96 is in proper condition for the contents of the shift register to circulate.

The Teach control 106 applies an enabling signal to one input of AND-gate 107, and signal A is applied to the other input of gate 107. This gate enables input gate 96 to transmit the pulse signals on line 94 into the Teach shift register 98 and to interrupt the circulating line 104. As the new pattern is being entered, the shift register is automatically cleared of its previous entries. Other applicable forms of shift register may require clearing in a preliminary operation.

As indicated previously, the apparatus is operated during setup in a preliminary mode or "Teach" mode for storing a pattern corresponding to the vidicon scan signal to represent an object that is oriented in the desired position in the vidicon field. For producing such a pattern, an object in the desired position is scanned by the vidicon and the resulting vidicon signal is modulated into a series of pulses in gate 90, appearing on line 94. This signal is transmitted via input gate 96 into shift register 98. At the end of signal A, gate 107 restores input gate 96 to its normal condition, coupling the circulating line 104 to the input of shift register 98 and blocking all subsequent signals from line 94 to Teach shift register 98. Accordingly, when Teach control is on, and when a Start signal to latch 70 (FIG. 3A) causes a signal A to appear, a pulse pattern of 512 bits is entered into shift register 98.

The Teach control 106 also enables input gate 108 of "Synchronizing"d shift register 110 to admit a pulse S at the end of signal A. Synchronizing shift register 110 is an exact duplicate of the circulating shift register 98. Pulse S is entered into the Synchronizing shift register as the last bit of its 512-bit capacity. Shift register 110 has a circulating signal connection 114 to its input gate 108, and it is kept in synchronous operation with "Teach" shift register 98 by clock pulses C1 and C2. Output 116 of Synchronizing shift register 110 provides a synchronizing pulse at the end of every 512 clock pulses to the shift registers, which is the same period required for one complete circulation of the contents of the Teach shift register.

When a "Read" operation is in effect (to be described below), an enabling control signal is applied to one input of AND-gate 120 and, accordingly, a series of synchronizing impulses B appear at the output of AND-gate 120 at the end of each 512-bit output period of shift register 98. The timing of pulse B is determined by Synchronizing shift register 110. The "Teach" mode is completed at the end of signal A, and gates 107, 96 and 108 are disabled as soon as a 512-pulse period has run out as determined by signal A. From that time forward, the recirculating signal channels 104 and 114 maintain the information that has been entered in the shift registers 98 and 110.

In the routine operation of the apparatus of FIG. 1, the conveyor delivers objects to support 32b in random angular orientation, and vidicon 36 is located in sensing position under program control in coordination with the motion of arm 16 away from support 32. Read control 124 is turned on during the entire time that objects are being delivered to support 32b. AND-gate 125 enables input gate 126 of Read shift register 128 to admit pulses on line 94 resulting from video output from the vidicon to be entered into the Random Position shift register 128. This shift register is identical to the Teach shift register, and it normally responds to clock pulses C1 and C2 for causing circulation of its contents via feedback connection 130. When gate 126 is opened by AND-gate 125 to admit a "random position" pulse pattern on line 94, gate 126 blocks signals on circulating line 130 from reaching the input end of shift register 128. This clears the shift register of its previous stored pattern. Signal A reaches gate 126 through gate 125 when Read control 124 is turned on so that, during a 512-bit interval when line 94 carries a "random position" pulse pattern, input gate 126 admits that pulse pattern to shift register 128. At the end of that interval, gate 125 is blocked and input gate 126 thereafter admits bits from its circulating connection 130 to sustain and circulate the newly entered "random position" pulse pattern.

During routine circulating operation of shift register 128, unit 132 blocks clock pulses C1 and C2 during the last clock pulse interval in each full circulation of the contents of Teach shift register 98. This occurs under control of one-bit timer 133, controlled in turn by AND-gate 135. This gate has one input energized by signal $\bar{A}$ (inverse of A) so as to be disabled for the duration of signal A. At other times, signal $\bar{A}$ on one input of gate 135 enables gate 135 to pass the B-pulses at its other input. Thus, when gate 135 supplies a signal B to timer 133, blanking circuit 132 is activated for the time needed to block one pair of pulses C1 and C2, suppressing the advance of shift register 128 during one pulse period.

This blocking of one pair of pulses C1 and C2 to shift register 128 does not occur during the time when a pulse pattern from line 94 is being entered into shift register 128. This is because signal $\bar{A}$ disables gate 135 during the 512-bit operation of entering a "random-position" pulse pattern into shift register 128. Otherwise, the B-pulse that occurs during the last bit of each subsequent 512-bit sequence causes suppression of the last pair of pulses C1 and C2 to shift register 128 which accordingly advances only 511 steps.

A pulse pattern of 512 bits is thus entered into the Random Position register 128, corresponding to a single circular scan of an object in scanning position, with random orientation, and thereafter shift register 128 advances only 511 steps during each full 512-bit advance of shift registers 98 and 110.

The patterns of pulses appearing at the output of the Teach shift register on line 102 and at the output of the Random Position shift register on line 136 are compared pulse by pulse in the one-bit serial comparator 134. Serial comparator 134 emits a pulse each time that there is a mismatch at lines 102 and 136.

The operation of the shift registers and comparator 134 may now be reviewed. The pattern of pulses stored in Teach shift register 98 and representing an object in the desired angular orientation is represented by the outline $p$ in FIG. 4. The pattern of pulses produced during a full 512-bit circular scan of an object in random angular orientation is stored in the Random Position shift register 128 and is represented by the outline $p'$ in FIG. 5. These pulse patterns are circulated repeatedly in each of the shift registers. The pulse pattern that represents the object in the desired or standard location appears at output 102 and the pulse pattern that represents an object in its random position appears at output 136. The circulation of the pulse pattern stored in Random Position shift register 128 is delayed for the duration of the last pulse width of each 512-pulse sequence.

During the first full circulation of the stored pulse patterns after entry of pulse pattern $p'$ in shift register 128, the shift registers 98 and 128 advance 511 steps in unison. Shift register 128 does not advance during the 512th pulse period of shift register 98. During the next 512-bit interval, shift register 128 is delayed one bit. There is one more one-bit delay in the output of shift register 128 during each full circulation of the stored pulse pattern in shift register 98.

Circulation of the contents of the shift registers 98, 110 and 128 goes on indefinitely, and comparator 134 compares each pulse pair at its inputs. The pulse output of comparator 134 (representing mismatches) is applied on line 142a to AND-gate 138, and it is also applied to the input of binary counter 140 which has a relatively small capacity. The purpose of AND-gate 138 and counter 140 is to suppress a representation of mismatch that would occur in case only one or two or some other limited number of bits stored in registers 98 and 128 should fail to match. In the illustration, counter 140 has three binary stages, each having a respective output lead 142 connected as inputs to AND-gate 138. These three leads 142 are to be connected to points in the counter circuit selected so that, when a prescribed number is reached, all three leads 142 apply enabling bias to gate 138. For example, this may be arranged to occur when five "mismatch" pulses appear during a 512-bit sequence. When five or any other preset number of mismatch pulses from serial comparator 134 reaches counter 140, all three output leads 142 apply enabling bias to gate 138. The last of those "mismatch" pulses will then pass from comparator 134 to input 142a and through gate 138 to the reset point K of comparator flip-flop 144. At the end of each 512-bit cycle of the synchronizing shift register 110, a synchronizing reset pulse B resets counter 140 to zero.

There are various reasons for suppressing or disregarding a limited number of mismatch bits among the 512 that are compared each time the contents of the Teach shift register completes a cycle of circulation. For example, at times there may be a spurious pulse and if that pulse should occur during the particular 512-bit comparison sequence when there actually happens to be agreement between registers 98 and 128, then the comparison operation could — erroneously — continue to seek the proper relationship between registers 98 and 128. Also, there may well be a meaningless mismatch between the 512the bit in register 98 as compared to the (delayed) output of shift register 128. It is contemplated that the output of comparator 134 may be blocked during the 512th pulse period of shift register 98 while shift register 128 is being delayed, as by an AND-gate activated by a B-pulse; but so long as counter 140 is provided, such added gate may not be warranted. Further, one pattern $p$ can have an edge part (as sensed and stored originally) that is about one-half of a bit displaced from the corresponding sensed and stored pattern $p'$. At a light-dark transition, the sensing process could yield different responses in the "Teach" and the "Read" responses of the vidicon. In that case, the two patterns might never match despite repeated recirculations. Other situations can arise that would produce an output from comparator 134 indicating a mismatch at a time when virtual match does happen to exist between the compared output pulses of registers 98 and 128. Suppressing the response to some small number of "mismatch" pulses may introduce some limited measure of inaccuracy, but it greatly improves the reliability of the system. If greater accuracy should be needed, the 512-bit comparison cycle can be increased to 1,024 bits, or more, without increasing the mismatch number for which counter 140 is set. On the other hand, gate 138 and counter 140 could be omitted by resorting to some other way of contending with occasional occurrences of such false mismatch indications. It follows that an excessive number of output pulses from comparator 134 during any one pulse-pattern comparison indicates a significant departure between the angular position representations of gates 98 and 128.

Each time there is no output from AND-gate 156 during a 512-bit synchronizing cycle, a count is entered into comparison counter 146. This operation is controlled by the following part of the system.

During operation of the apparatus with Read control 124 turned on, a start pulse to Start flip-flop 70 (caused by the arrival of a random-positioned article at support 32b) causes signal A to develop. Signal Y which ends at the start of signal A resets counter 146 to −1. Signal A to gate 125 renders input gate 126 operative to enter a 512-bit pulse pattern $p'$ into shift register 128. Completion of the entry of a pulse pattern representing an article in random position is signalled by the appearance of pulse S. At this time, synchronizing shift register 110 produces a B-pulse. Comparison flip-flop 144 is in its reset state because of the high probability of some pulses reaching reset input K previously. Pulse S to AND-gate 148 sets Load-Latch flip-flop 150 which applies an enabling signal to one input of AND-gate 152. A pulse B is connected to the other input of gate 152 (using delay elements as needed) so that at the end of the operation of entering a pulse pattern $p'$ into shift register 128, a B-pulse passes through gate 152. This pulse is transmitted via AND-gate 154 to comparison counter 146, advancing it to zero. At this time, gate 154 is enabled and gate 156 is disabled by their respective connections to outputs $\overline{Q}$ and Q of flip-flop 144 which is in its reset state. Accordingly, counter 146 has a zero value during the first comparison of shift registers 98 and 128 following entry of pulse pattern $p'$.

The first B-pulse that passes through gate 152 is applied to the J-input of comparison flip-flop 144. With some delay flip-flop 144 is set, so that its output $\overline{Q}$ disables gate 154 against subsequent response to B-pulses from gate 152, and output Q enables gate 156. At this point, the first sequence of comparing shift registers 98 and 128 commences.

There is a rare possibility of the output of comparator 134 showing that the random-positioned article happened by chance to be in the desired position, the same position as the article that was scanned to enter the pulse pattern stored in Teach shift register 98. In that case, no reset pulse to input K of flip-flop 144 appeared during the first comparison sequence of shift registers 98 and 128, and the synchronizing pulse B at the end of this comparison passes through gate 156 and causes immediate parallel transfer of the contents of comparison counter 146 to storage 158. In this situation, the comparison counter contained zero, and therefore the control output of storage 158 is zero. This signifies no departure of the work holder about its axis for adjusting an article from that rare case random position to the desired position. There is zero input from connection 160 to summer 40 (FIG. 1), so that the work holder is operated directly under program control, without introducing an offset from the established program that determines the angular positioning of work head 18, i.e., the standard position used in the "Teach" process. A signal on line 160′ provides control input to the program controller of apparatus 10 which determines the sequential operations of apparatus 10.

When the synchronizing pulse passes through gate 156 as described, it also resets load latch 150. Thereafter no further synchronizing pulses B can pass through gate 152.

Ordinarily the position of an article delivered at random to support 32b will not be in the desired angular position so that an angular correction will be required. In that case, the pulse patterns in shift registers 98 and 128 will not match in the first comparison sequence. The output of comparator 134 will cause gate 138 to emit a reset pulse to comparison flip-flop 144 at some time during the comparison sequence, resetting flip-flop 144 and thereby enabling gate 154 and disabling gate 156. Consequently when the next B-pulse appears, it is passed by gates 152 and 154 to enter a pulse into comparison counter 146 to advance the counter to "1". Gate 156 is disabled so that there is no transfer to storage register 158.

The foregoing sequence of operations is repeated once for each comparison cycle terminated by a synchronizing pulse B. But between each comparison sequence and the next, blanking unit 132 introduces a one-bit shift in the relationship between the pulse pattern in the Random Position shift register and that in Teach shift register 98. Successive one-bit shifts between the pulse patterns occur and counter 146 counts the comparison cycles until match occurs. At the time that match does occur, there is a value $n$ in the counter. This value represents $n/512$ of 360°, the angle required to correct a particular random-positioned object to the desired angular position.

The physical operation of the apparatus to this point involves the delivery of an article to work support 32b, the advance of vidicon 36 into position over the work support. The vidicon can be positioned fixedly above the operating space of the article transfer unit, fixed in position above the work support. The random-position scan is executed under control of Start flip-flop 70, and the 512-bit comparison sequences follow. In the worst case of departure of a random-position article from the desired position, 512 comparisons would be required. Since each cycle takes about 0.0005 second at the selected clock pulse frequency of 10z 4kHz. about 0.25 second would suffice for 500 comparisons. This time is eminently practical. During this time interval, the vidicon is retracted and the article transfer unit 10 executes its own program-controlled sequence of motions. As part of that program, the work holder ultimately moves into position to seize an article W, subject to an "external signal" control. Such program controls are characteristic of automatic article transfer apparatus, as for example in the above-mentioned U.S. Pat. No. 3,306,471. In the present apparatus, a "ready" signal for the article transfer program control system is provided on line 160′; and at the same time, the digital angular correction value from storage 158 is available for the summer 40 to combine with the digital output of the angular head position program. The work holder will ordinarily engage and pick up a workpiece with a preprogrammed angular position that is proper for an article in its standard or desired angular position. Here the work holder is given an angular offset from its programmed position, an offset determined by the output of storage 158. The work holder can be a vacuum-type device, or it can have plural jaws or fingers. It is adjusted automatically under program control and the control information from storage 158 to have the same orientation relative to an article on support 32b in random position as it had during the "-Teach" process. Thereafter the transfer apparatus seizes the article, and it continues to function according to the originally programmed coordinates. In executing the next transfer motion, the article holder resumes its program-controlled orientation, and the article accordingly assumes its desired orientation. It will be understood that this is but one of two alternative program-control sequences that can be executed for picking up an article in random position and delivering it in prescribed angular orientation. In case an article holder is used that does not require adjustment to a prescribed relationship to an article to grip it, a vacuum head for example, or an electromagnet, the work head program can cause the article holder to seize the article in random position and then the summer 40 causes corrective angular orientation of the workpiece to preprogrammed orientation at the delivery point modified in accordance with the output of storage 158.

A modification of the system of FIGS. 3A and 3B is readily understood from what has already been shown and described. Signals C4 can be used in place of signals B, and in that case synchronizing shift register 110 would be omitted. There is some advantage to be gained through the use of synchronizing shift register 110 from the viewpoint of dependability, of accurate, consistent synchronization of shift registers 98 and 128 and the generation of the synchronizing pulse. However, C4 pulses can be used for synchronization instead of B pulses if the need for circuit simplification justifies the omission of shift register 110.

Figure 6:
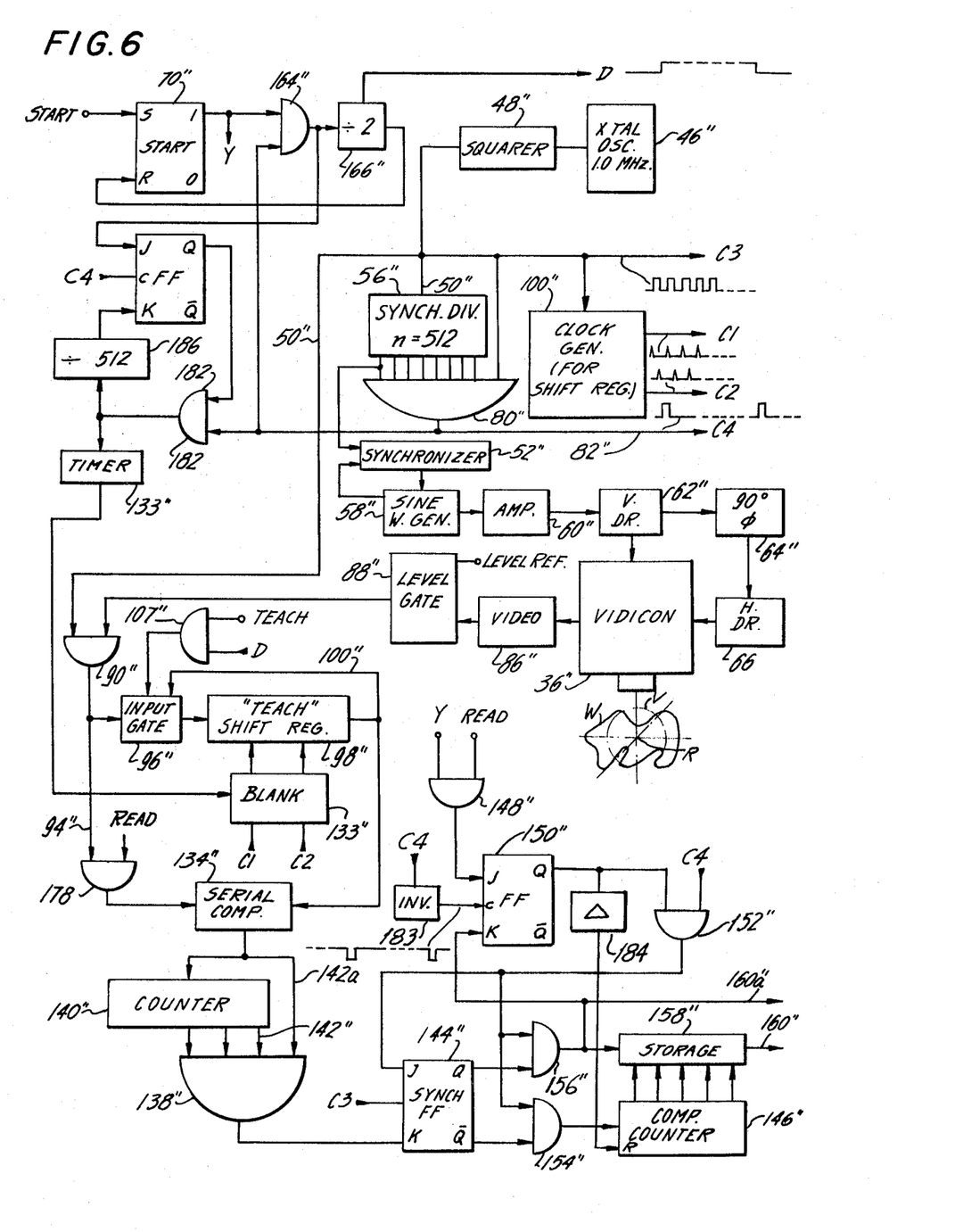
FIG. 6 is a blocked diagram of another preferred form of the control apparatus like that of FIGS. 3A and 3B.

A still further embodiment of certain features of the invention is illustrated in FIG. 6. In FIG. 6 there is only one shift register, the Teach shift register. It is used for storing the pulse pattern of the scanned object in its desired angular orientation. The Teach pulse pattern is here compared repeatedly with a a pulse pattern derived directly from the video output obtained by scanning the random-positioned object, rather than with a pulse pattern provided by a Random Position shift register as in FIGS. 3A–3B. In FIG. 6, the vidicon deflection sine-wave signal is continuous, and the pulse comparison timing cycle and the vidicon scan are synchronized. In this example, sine-wave generator 58″ is voltage responsive, so as to be phase locked to synchronizing pulses C4 from divider 56″ or (as shown) to the final counter stage of divider 56″.

Figure 4:
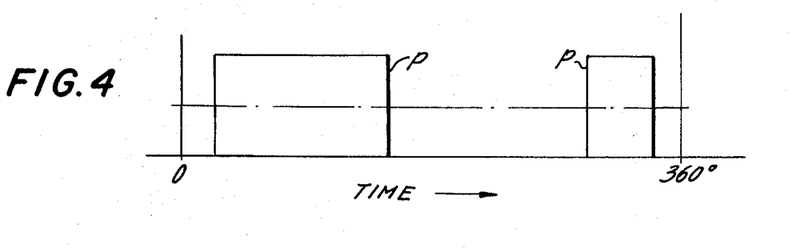
FIG. 4 is a signal-versus-time diagram representing the circular scan of an object in the desired position.
Figure 5:
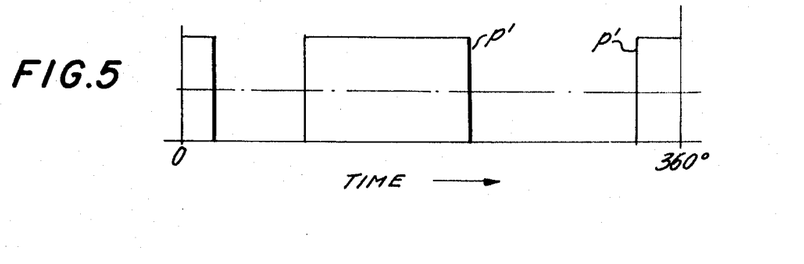
FIG. 5 is a signal-versus-time diagram representing the circular scan of a duplicate object in a different, random position.

Parts 46″ 48″ 56″ 58″ 60″ 62″ 64″ 66″ 36″ 80″ 86″ 88″ and 100″ operate the same as the correspondingly numbered parts in FIG. 13A to generate square-wave pulses C3 and clock pulses C1 and C2, to divide by 512 (in an example) for producing synchronizing pulses C4 on line 82″ to generate horizontal and vertical deflection drive for continuous circular scanning in vidicon 36″ and to produce threshold- and peak-limited video output signals at an input of AND-gate 90″ as in FIGS. 4 and 5.

In FIG. 6, a Start signal sets Start flip-flop 70″. The "1" output of flip-flop 70″ provides signal Y, and it enables AND-gate 164″ to pass the next-occurring synchronizing pulse C4 on output line 82″ from divider 56″. This changes one-stage binary counter unit 166″ from its "0" state to its "1" state. At the end of 512 square wave pulses C3, the next synchronizing pulse C4 restores counter 166″ to "0" and counter 166″ resets Start flip-flop 70″. Signal D from unit 166″ starts with one synchronizing pulse C4 and ends with the next synchronizing pulse. This signal is used to determine the time during which the Teach pulse pattern of an object in the desired position is entered in the Teach shift register 98″.

AND-gate 107″ controls the input gate 96″ of Teach shift register 98″. Gate 107″ is enabled when the Teach control is turned on. A start signal is provided after an object is positioned for vidicon scanning with the object in the desired angular position. An output signal D from unit 166″ passes gate 107″ to cause entry of the Teach pulse pattern $p$ into shift register 98″ from pulse-modulating AND-gate 90″. For the duration of pulse D, pulses from gate 90″ are entered into shift register 98″. Clock pulses C1 and C2 pass-blanking circuit 132″ and advance the contents of the shift register one step as each bit is entered at gate 98″. At the end of pulse D, input gate 96″ interrupts signals from gate 90″ and thereafter the entered pulse pattern is circulated in the shift register via feedback connection 100″ by clock pulse pairs C1 and C2. This circulation is continued synchronously with the continuing circular scans following the Teach process, except that the circulation is modified during the comparison process in the Read mode (to be described), after which the circulation of the stored Teach pulse pattern in synchronism with the circular scan is resumed. The circular scan of the vidicon during the Teach mode and during the Read mode have a constant prescribed starting point determined by synchronizing pulses C4 on line 82″.

When the apparatus of FIG. 1 is in routing operation for scanning successive random-positioned objects, the Teach control is turned off and the Read control is turned on. Read control bias is applied to the enabling input of AND-gate 178 at the output of Modulator gate 90″. Read bias is also applied to the enabling input of AND-gate 148″ connected to the setting input of Load-Latch flip-flop 150″. The pulse train from shift register 98″ corresponding to pulses $p'$ (FIG. 4) and the pulse train from gate 178 corresponding to pulses $p'$ (FIG. 5) are supplied to serial comparator 134″. The output of the comparator is supplied continuously to counter 140 AND-gate 138″ has a direct input 142a″ from comparator 134″ and other inputs 142″ to gate 138″are are connected to predetermined count points in counter 140″ as in 3B. Any signal output from gate 138″ that represents mismatch between pulse patterns $p$ and $p'$, and appears at reset input K of synchronous flip-flop 144″.

There are 512 comparison sequences each time that a new workpiece W is presented in random orientation scanning. The comparison process is started by a start signal provided in coordination with the delivery of an article W to the field of the vidicon. A Start impulse to start flip-flop 70″ and a following synchronizing pulse C4 on line 82″ act via AND-gate 164″ to set flip-flop 180. The output of this flip-flop is applied to an enabling input of AND-gate 182. The setting of flip-flop 180 takes enough time (or can be suitably gated) so that the "-set" signal does not appear at output "1" of flip-flop 180 until the fall of pulse C4. The ensuing synchronizing pulses C4 from line 82″ to the signal input of gate 182 are transmitted to 512-bit counter 186. Flip-flop 180 is reset by the output of counter 186 at the end of 512 synchronizing pulses C4. With the assumed oscillator and synchronizing frequencies, and the selected factor 512, this process is completed in about one fourth second.

After Start flip-flop 70″ has been set and until flip-flop 180 has been reset, a series of 512 pulses C4 appears at the output of gate 182 and they are applied as control signals to timing circuit 133″. When a pulse is received from gate 182, timer 133″ applies control bias to blanking circuit 132″ to suppress a pair of pulses C1 and C2 during the 512th pulse periods marked by the synchronizing pulses. Accordingly, so long as flip-flop 180 is set, there is a one-bit retarded shift of the pulse pattern in shift register 98″ for each complete circular scan of the random-positioned object. This one-bit retarded shift does not take place during the Teach process, due to the fact that the synchronizing pulse C4 that initiates Teach timing signal D does not reach circuit 133″. This is because of the internal (or gated) delay in setting of flip-flop 180 mentioned previously.

Each time that a pair of clock pulses C1 and C2 to shift register 98″ is blanked, the circulation of the shift register contents falls one bit farther behind the synchronizing pulse C4. These one-bit shifts are repeated until, after 512 pulses C4 to gate 182, the initial relationship is restored between the circulation of the storage in Teach shift register 98″ and the circular scan. At this point flip-flop 180 is reset, no further synchronizing pulses pass through gate 182, and there are no further one-bit delays in the circulation of Teach shift register 98″.

During each interval between one synchronizing pulse C4 and the next, following a Start impulse, serial comparator 134″ compares the pulse pattern sequences from shift register 98″ and from AND-gate 178, bit by bit. If the number of mismatch occurrences in any given 512-bit comparison sequence exceeds the value for which counter 140″ is set (such as five mismatches), then a pulse from comparator AND-gate 138″ is applied to reset input K of flip-flop 144″.

The part of the apparatus for counting the "mismatch" output signals from the comparator gate 138″ includes an AND-gate 148″ having an enabling input connected to the Read control and another input connected to the Y-signal terminal, i.e., the "1" terminal of Start flip-flop 70″. The output of AND-gate 148″ is applied to the setting terminal of Load Latch flip-flop 150″. This is a synchronous flip-flop having input clock pulses $\overline{C4}$. This is the inverse of pulse C4 or the "not C4" signal, derived by a simple inverter 183 from pulse C4. Flip-flop 150″ responds to the setting input from gate 148″, but not until the rise of the first pulse C4 after the start of signal Y. The "Q" output of Load Latch 150″ enables AND-gate 152″ in time to respond to the first pulse C4 occurring with the fall of signal $\overline{C4}$.

The counter 146″ is set to -1 by a suitably derived reset pulse at or nearly at the setting of Load Latch flip-flop 150″. For example, such a pulse can be provided by a differentiator 184 connected to the "Q" terminal of flip-flop 150″. Pulses C4 to gate 152″ pass through this gate immediately after flip-flop 150″ is set. The first synchronizing pulse C4 from gate 152″ is transmitted to gate 154″ and causes comparator counter 146″ to advance from -1 to 0. The first synchronizing pulse C4 also sets flip-flop 144″. As in the apparatus of FIG. 3B, the time required for setting flip-flop 144″ is such that terminal $\overline{Q}$ remains in its initial state long enough to enable gate 154″ to pass the first pulse C4 and gate 156″ is not enabled by the changed signal at the Q output of flip-flop 144″ until this first pulse C4 has passed.

From the foregoing, it will be recognized that the first significant comparison operation by comparator 134″ is initiated by the first pulse C4 that passes through gate 152″, following setting of the Start flip-flop 70″. Comparator counter 146″ registers "0" at the start of this first comparison operation. The first synchronizing pulse C4 following a Start signal does not pass gate 182 because of the time lag of flip-flop 180 in responding to the setting signal from gate 164″ so that, because of this suppression of the first pulse C4 at gate 182, there is no one-bit retarding shift of shift register 98″ in relation to the scanning operation during the first pulse pattern comparison operation. Just before the first pulse pattern comparison, flip-flop 144″ is in its reset state due to the very high probability of an output pulse from gate 138″ previously. Flip-flop 144″ is then set at the start of the first comparison operation.

As in the embodiment of FIG. 3A-3B, there is a 512:1 chance that the random-positioned object being scanned happens to be in the desired position represented by the stored pulse pattern in shift register 98″. In that case gate 138″ produces no "mismatch" output during the first comparison operation, and the pulse C4 occurring at the end of the first comparison operation passes gates 152″ and 156″ to effect transfer of the contents of comparator counter 146″ to storage 158″ and to provide a control signal on line 160″ to the program control apparatus of article transfer unit 10. The same pulse from gate 156″ resets Load-Latch flip-flop 150″ so that no subsequent pulses pass through gate 152″.

In case there is a mismatch during the first comparison operation, a pulse from gate 138″ resets flip-flop 144″ and then the synchronizing pulse C4 occurring at the end of the comparison operation passes through gates 152″ and 154″ to comparator counter 146″ to advance this counter to "1".

In succeeding comparison operations between successive synchronizing pulses C4, the value in the counter advances one unit for each "mismatch" comparison operation. When "-match" does occur, counter 146″ does not advance, the count is transferred to storage 158″, and a control output pulse appears on line 160a″, and channel 160″ provides digital output for use in summer 40, in the program-controlled operation of the article transfer apparatus.

The apparatus continues the described comparison operations after occurrence of "match" between the stored pulse pattern in register 90″ and the random-position pulse pattern derived repeatedly from the vidicon. During those operations and before the next Start signal, a pulse from gate 138″ to the reset input of flip-flop 144″ inevitably occurs. This effect insures resetting of flip-flop 144″ as already mentioned.

The apparatus of FIG. 6 depends continuously on the vidicon to provide the pulse pattern representing the random-positioned article. It therefore follows that, for the ¼-second interval in the example given, the vidicon may not be obstructed by the article transfer head. Ordinarily that would create no difficulty, since the article-transfer apparatus requires some seconds, at least, to remove the previously scanned object and to carry out even a minimal operation. However it will be recalled that the apparatus of FIG. 3A-3B requires the vidicon to be unobstructed only during the time needed for a first scan of each object in scanning position, an advantage where that time may be important.

The foregoing exemplary apparatus involving several features of the invention is naturally susceptible of modification and varied application by those skilled in the art. Consequently the invention should be construed broadly in accordance with its full spirit and scope.

What is claimed is:

1. Apparatus for controlling the adjustment of an object from a random angular position to a desired angular position about a reference point, including separate means for providing circular scan representations of the object when in the desired angular position and when in a random angular position, means for shifting one of said circular scan representations relative to the other by increments, means for comparing said one of said representations in its initial state and in its successive incrementally shifted states with said other of said representations, said comparing means being adapted to indicate substantial "match" and "mismatch", a counter for registering the number of comparisons and incremental shifts occurring until substantial match develops between the compared representations, and means responsive to said counter for adjusting the position of the random positioned article represented by the scan thereof.

2. Apparatus in accordance with claim 1, including separate means for storing said representations as patterns of equal numbers of bits, said shifting means being adapted to shift the contents of one of said storing means one bit at a time and wherein said comparing means is adapted to compare the contents of said separate storing means between one shift and the next.

3. Apparatus in accordance with claim 1, including first and second registers for storing said representations of the positions of the object as first and second patterns of equal incremental bits, at least one of said registers being a circulating shift register, and wherein said shifting means is arranged to shift the storage in said one shift register one bit in relation to the storage in the other register from each comparison to the next.

4. Apparatus in accordance with claim 1, including first and second circulating shift registers for storing each of said representations as a series of equal incremental bits, and means for circulating the contents of said shift registers in concurrent steps.

5. Apparatus in accordance with claim 4, wherein said shifting means is effective for blocking one shifting step of one of said shift registers during each full circulation of the contents of the other of said shift registers.

6. Apparatus in accordance with claim 4, wherein said comparing means comprises a serial one-bit comparer responsive to the successive pairs of output bits of said shift registers.

7. Apparatus in accordance with claim 4, wherein said comparing means comprises a serial one-bit comparer responsive to the successive pairs of output bits of said shift registers, and wherein said comparing means further comprises a counter that is effective to suppress mismatch-signifying output of the comparing means when there are less than a prescribed number of mismatch responses of the serial comparer in comparing the contents of said registers.

8. Apparatus in accordance with claim 1, wherein said separate circular scan representation means include a circulating shift register for storing a pattern of bits and sequentially emitting a corresponding pattern of pulses representing the object in the desired position and means for repeatedly scanning a random-positioned object, said comparing means being a serial one-bit comparer arranged to respond to said pattern of pulses and a corresponding pattern of increments in the output of said circular scanning means.

9. Apparatus in accordance with claim 1, wherein said separate circular scan representation means include a circulating shift register for storing a pattern of bits and sequentially emitting a corresponding pattern of pulses representing the object in the desired position and means for repeatedly scanning a random-positioned object, said comparing means being a serial one-bit comparer arranged to respond to said pattern of pulses and a corresponding pattern of increments in the output of said circular scanning means, said apparatus including means for synchronizing the circulation of said shift register and the operation of said scanning means in an original relationship, wherein said shifting means is arranged to introduce a one-bit interruption in the circulation of said shift register for each circular scan of said circular scanning means until said signal relationship is restored.

10. Apparatus in accordance with claim 1, including means providing a synchronizing pulse in time with each comparison of said scan representations, and a control circuit responsive to said comparing means and effective in case of a mismatch to direct a synchronizing pulse to said counter, said control circuit being responsive to said comparing means in case of a match to direct a synchronizing pulse as a control signal for said article position adjusting means.

11. Apparatus in accordance with claim 1, wherein said circular scan representation means are arranged to apply their respective representations to said comparing means as patterns of discrete bits, said apparatus including means for suppressing a limited number of mismatch responses in the comparisons of the bits of said patterns.

12. Apparatus in accordance with claim 11, wherein said comparing means is arranged to compare successive pairs of bits of said patterns of bits.

13. Apparatus in accordance with claim 8, including means for suppressing output of the comparing means in case of mismatch of a limited number of compared pairs of bits in any one comparison of said pattern of pulses and said pattern of increments.

14. Apparatus for indicating the extent to which an object in a random position departs from a desired position, including separate means for providing representations of the object in the desired position and in the random position, respectively, in the form of patterns of increments, means for shifting one of said representations relative to the other successively one increment at a time in the direction to establish substantial match of the patterns, means for comparing said patterns of increments repeatedly in timed relation to said shifting means, and means for counting the number of comparisons and shifts occurring until substantial match occurs at the comparing means, the counting means thereby indicating the number of increments by which the random position differs from the desired position.

* * * * *